(12) United States Patent
Hioda

(10) Patent No.: US 11,148,633 B2
(45) Date of Patent: Oct. 19, 2021

(54) VEHICLE AIRBAG DEVICE

(71) Applicant: TOYOTA JIDOSHA KABUSHIKI KAISHA, Toyota (JP)

(72) Inventor: Seiji Hioda, Tokai (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 69 days.

(21) Appl. No.: 16/521,865

(22) Filed: Jul. 25, 2019

(65) Prior Publication Data

US 2020/0079315 A1 Mar. 12, 2020

(30) Foreign Application Priority Data

Sep. 12, 2018 (JP) .............................. JP2018-170903

(51) Int. Cl.
| | |
|---|---|
| *B60R 21/239* | (2006.01) |
| *B60R 21/205* | (2011.01) |
| *B60R 21/232* | (2011.01) |
| *B60R 21/213* | (2011.01) |
| *B60R 21/233* | (2006.01) |
| *B60R 21/2338* | (2011.01) |

(Continued)

(52) U.S. Cl.
CPC .......... *B60R 21/239* (2013.01); *B60R 21/205* (2013.01); *B60R 21/213* (2013.01); *B60R 21/232* (2013.01); *B60R 21/233* (2013.01); *B60R 21/2338* (2013.01); *B60R 2021/0009* (2013.01); *B60R 2021/23107* (2013.01); *B60R 2021/23382* (2013.01)

(58) Field of Classification Search
CPC .... B60R 2021/0009; B60R 2021/0023; B60R 2021/23107; B60R 2021/23382; B60R 21/205; B60R 21/213; B60R 21/232; B60R 21/233; B60R 21/2338; B60R 21/239

See application file for complete search history.

(56) References Cited

U.S. PATENT DOCUMENTS 9,296,360 B2 * 3/2016 Komamura ......... B60R 21/0136
9,469,269 B2 * 10/2016 Hiruta ................... B60R 21/231
9,862,347 B2 * 1/2018 Deng .................... B60R 21/203
(Continued)

FOREIGN PATENT DOCUMENTS

| JP | 2013-133049 A | 7/2013 |
|---|---|---|
| JP | 2016-055824 A | 4/2016 |

(Continued)

*Primary Examiner* — Laura Freedman
(74) *Attorney, Agent, or Firm* — Oliff PLC

(57) ABSTRACT

A vehicle airbag device including a curtain airbag inflated and deployed from a vehicle width direction outer side end portion of a ceiling toward a vehicle lower side by gas being supplied into the curtain airbag from an inflator actuated in a vehicle collision to generate the gas; and a front passenger seat airbag inflated and deployed in front of a front passenger seat by gas being supplied into the front passenger seat airbag from an inflator actuated in a vehicle collision to generate the gas, including a first side-wall and a vent hole. The first side-wall configures a vehicle width direction outer side location of the front passenger seat airbag, includes an abutting portion that abuts the curtain airbag when inflated and deployed, and is spaced apart from a front pillar garnish. The vent hole is provided in the first side-wall on the front pillar garnish side.

12 Claims, 4 Drawing Sheets

(51) Int. Cl.
*B60R 21/00* (2006.01)
*B60R 21/231* (2011.01)

(56) References Cited

U.S. PATENT DOCUMENTS

| | | | |
|---|---|---|---|
| 9,994,184 B2 * | 6/2018 | Deng | B60R 21/0136 |
| 10,501,044 B2 * | 12/2019 | Moon | B60R 21/233 |
| 10,829,081 B2 * | 11/2020 | Nakajima | B60R 21/2035 |
| 2014/0203541 A1 * | 7/2014 | Wei | B60R 21/233 |
| | | | 280/730.2 |
| 2016/0200281 A1 * | 7/2016 | Takeshita | B62D 1/11 |
| | | | 280/730.2 |
| 2017/0072896 A1 | 3/2017 | Fukawatase et al. | |
| 2017/0088083 A1 | 3/2017 | Hiraiwa et al. | |

FOREIGN PATENT DOCUMENTS

| | | |
|---|---|---|
| JP | 2017-056802 A | 3/2017 |
| JP | 2017-065399 A | 4/2017 |

\* cited by examiner

VEHICLE AIRBAG DEVICE

CROSS-REFERENCE TO RELATED APPLICATION

This application claims priority under 35 USC 119 from Japanese Patent Application No. 2018-170903 filed on Sep. 12, 2018, the disclosure of which is incorporated by reference herein in its entirety.

BACKGROUND

Technical Field

The present disclosure relates to a vehicle airbag device.

Related Art

Japanese Patent Application Laid-Open (JP-A) No. 2013-133049 discloses an invention relating to an occupant protection device. This occupant protection device includes a front passenger seat airbag that inflates and deploys in front of an occupant, and a curtain airbag that inflates and deploys at a vehicle width direction outer side of the occupant such that a portion of the curtain airbag abuts the front passenger seat airbag. A side-wall on the vehicle width direction outer side of the front passenger seat airbag is provided with a vent hole to allow gas supplied into the front passenger seat airbag when inflated and deployed to escape. The curtain airbag is formed with an escape flow path to allow gas passing through the vent hole in the front passenger seat airbag to escape. The curtain airbag is thus suppressed from impeding the escape of gas through the vent hole in the front passenger seat airbag when the front passenger seat airbag and the curtain airbag are inflated and deployed.

In a collision at an angle, such as an oblique collision, since the head of the occupant moves obliquely forward toward between the front passenger seat airbag and the curtain airbag, it is desirable to increase vehicle width direction dimensions of the front passenger seat airbag and the curtain airbag when inflated and deployed so as to increase an interference amount and interference range between the front passenger seat airbag and the curtain airbag in order to more reliably restrain the occupant. However, in the configuration disclosed in JP-A No. 2013-133049, the escape flow path formed to the curtain airbag is a recessed groove that does not inflate in the vehicle width direction. Accordingly, if the vehicle width direction dimensions of the front passenger seat airbag and the curtain airbag when inflated and deployed were to be increased in order to improve restraint performance in an oblique collision, it might not be possible to dispose a vent hole so as to allow gas to escape appropriately. The technology in JP-A No. 2013-133049 thus leaves room for improvement in this regard.

SUMMARY

The present disclosure obtains a vehicle airbag device capable of achieving stable functioning of a vent hole in a front passenger seat airbag.

A first aspect of the present disclosure is a vehicle airbag device including a curtain airbag and a front passenger seat airbag. The curtain airbag that is inflated and deployed from a vehicle width direction outer side end portion of a ceiling toward a vehicle lower side by gas being supplied into the curtain airbag from an inflator actuated in a vehicle collision to generate the gas, and a front passenger seat airbag that is inflated and deployed in front of a front passenger seat by gas being supplied into the front passenger seat airbag from an inflator actuated in a vehicle collision to generate the gas, and that includes a first side-wall and a vent hole, the first side-wall configuring a vehicle width direction outer side location of the front passenger seat airbag, including an abutting portion that abuts the curtain airbag when inflated and deployed, and being spaced apart from a front pillar garnish, and the vent hole being provided in the first side-wall on a front pillar garnish side.

The vehicle airbag device of the first aspect includes the curtain airbag and the front passenger seat airbag. The curtain airbag is inflated and deployed from the vehicle width direction outer side end portion of the ceiling toward the vehicle lower side by gas being supplied into the curtain airbag from the inflator actuated in a vehicle collision to generate the gas. The front passenger seat airbag is inflated and deployed in front of the front passenger seat by gas being supplied into the front passenger seat airbag from the inflator. The front passenger seat airbag includes the first side-wall configuring the vehicle width direction outer side location of the front passenger seat airbag. The first side-wall includes the abutting portion that abuts the curtain airbag when inflated and deployed. The first side-wall is also spaced apart from the front pillar garnish when inflated and deployed, and the vent hole is provided in the first side-wall on the front pillar garnish side. Accordingly, even when the front passenger seat airbag and the curtain airbag are set with large vehicle width direction dimensions when inflated and deployed in order to improve restraint performance in an oblique collision or the like, and an amount of interference and range of interference between the front passenger seat airbag and the curtain airbag are large, gas is not impeded from escaping through the vent hole by the front pillar garnish or the curtain airbag when inflated and deployed.

A second aspect of the present disclosure is the vehicle airbag device of the first aspect, wherein a tether that pulls the first side-wall toward a vehicle width direction inner side when the front passenger seat airbag is inflated and deployed is attached at a vehicle rear side of the vent hole in the first side-wall of the front passenger seat airbag.

According to the second aspect, the tether is attached at the vehicle rear side of the vent hole in the first side-wall of the front passenger seat airbag. The tether is configured to pull the first side-wall toward the vehicle width direction inner side when the front passenger seat airbag is inflated and deployed. Accordingly, the first side-wall is reliably kept spaced apart from the front pillar garnish by the tether, and since the vent hole is disposed close to the tether, gas can more reliably escape through the vent hole.

A third aspect of the present disclosure is the vehicle airbag device of the second aspect, wherein the front passenger seat airbag includes a second side-wall opposing the first side-wall and positioned at a vehicle width direction outer side of a vehicle-interior projecting object provided at an instrument panel so as to project into a vehicle cabin. Moreover, the tether is attached to the second side-wall at a vehicle rear side of a location corresponding to the vehicle-interior projecting object so as to pull the second side-wall toward the vehicle width direction outer side when the front passenger seat airbag is inflated and deployed.

According to the third aspect, the front passenger seat airbag includes the second side-wall opposing the first side-wall. The second side-wall is positioned at the vehicle width direction outer side of the vehicle-interior projecting object provided to the instrument panel so as to project into the vehicle cabin. Moreover, the tether is attached to the second side-wall at the vehicle rear side of the location corresponding to the vehicle-interior projecting object. The tether pulls the second side-wall toward the vehicle width direction outer side when the front passenger seat airbag is inflated and deployed. This thereby enables interference between the front passenger seat airbag and the vehicle-interior projecting object, which would impede inflation and deployment in a vehicle collision, to be suppressed.

A fourth aspect of the present disclosure is the vehicle airbag device of the second aspect or the third aspect, wherein the tether is provided at a vehicle front side of the abutting portion of the front passenger seat airbag.

According to the fourth aspect, due to providing the tether at the vehicle front side of the abutting portion of the first side-wall of the front passenger seat airbag, the interference amount between the front passenger seat airbag and the curtain airbag is not reduced. Namely, since a gap is provided between the vent hole and the front pillar garnish, gas is able to escape smoothly through the vent hole while restraint performance of the head of an occupant moving obliquely forward to between the front passenger seat airbag and the curtain airbag in an oblique collision or the like is maintained.

A fifth aspect of the present disclosure is the vehicle airbag device of any one of the second aspect to the fourth aspect, wherein an end portion of the tether is attached superimposed on the first side-wall in a thickness direction so as to surround an outer edge portion of the vent hole.

According to the fifth aspect, the end portion of the tether is attached superimposed on the first side-wall in the thickness direction so as to surround the outer edge portion of the vent hole, thereby enabling the vent hole to be reinforced. Namely, since the tether doubles as a reinforcing patch for the vent hole, there is no need for a separate reinforcing patch for the vent hole.

A sixth aspect of the present disclosure is the vehicle airbag device of the first aspect, wherein a vehicle width direction dimension of a vehicle front side end portion of the front passenger seat airbag is smaller than a vehicle width direction dimension of a vehicle rear side end portion of the front passenger seat airbag such that the front passenger seat airbag does not abut the front pillar garnish.

According to the sixth aspect, in the front passenger seat airbag, the vehicle width direction dimension of the vehicle front side end portion is set smaller than the vehicle width direction dimension of the vehicle rear side end portion such that the front passenger seat airbag does not abut the front pillar garnish. Accordingly, a gap can be provided between the first side-wall and the front pillar garnish using the shape of the front passenger seat airbag itself. This thereby allows gas to escape more reliably through the vent hole using a simple configuration.

As described above, the vehicle airbag device according to the first aspect enables stable functioning of the vent hole in the front passenger seat airbag to be achieved.

The vehicle airbag device according to the second aspect enables even more stable functioning of the vent hole in the front passenger seat airbag to be achieved.

In the vehicle airbag device according to the third aspect, the front passenger seat airbag does not interfere with the vehicle-interior projecting object, thereby enabling deployment performance of the front passenger seat airbag to be improved.

The vehicle airbag device according to the fourth aspect enables stable functioning of the vent hole in the front passenger seat airbag to be achieved while improving occupant restraint performance in an oblique collision.

The vehicle airbag devices according to the fifth aspect and the sixth aspect enable both a reduction in costs and stable functioning of the vent hole in the front passenger seat airbag to be achieved.

BRIEF DESCRIPTION OF THE DRAWINGS

Exemplary embodiments of the present disclosure will be described in detail based on the following figures, wherein.

DETAILED DESCRIPTION

First Exemplary Embodiment

Figure 1:
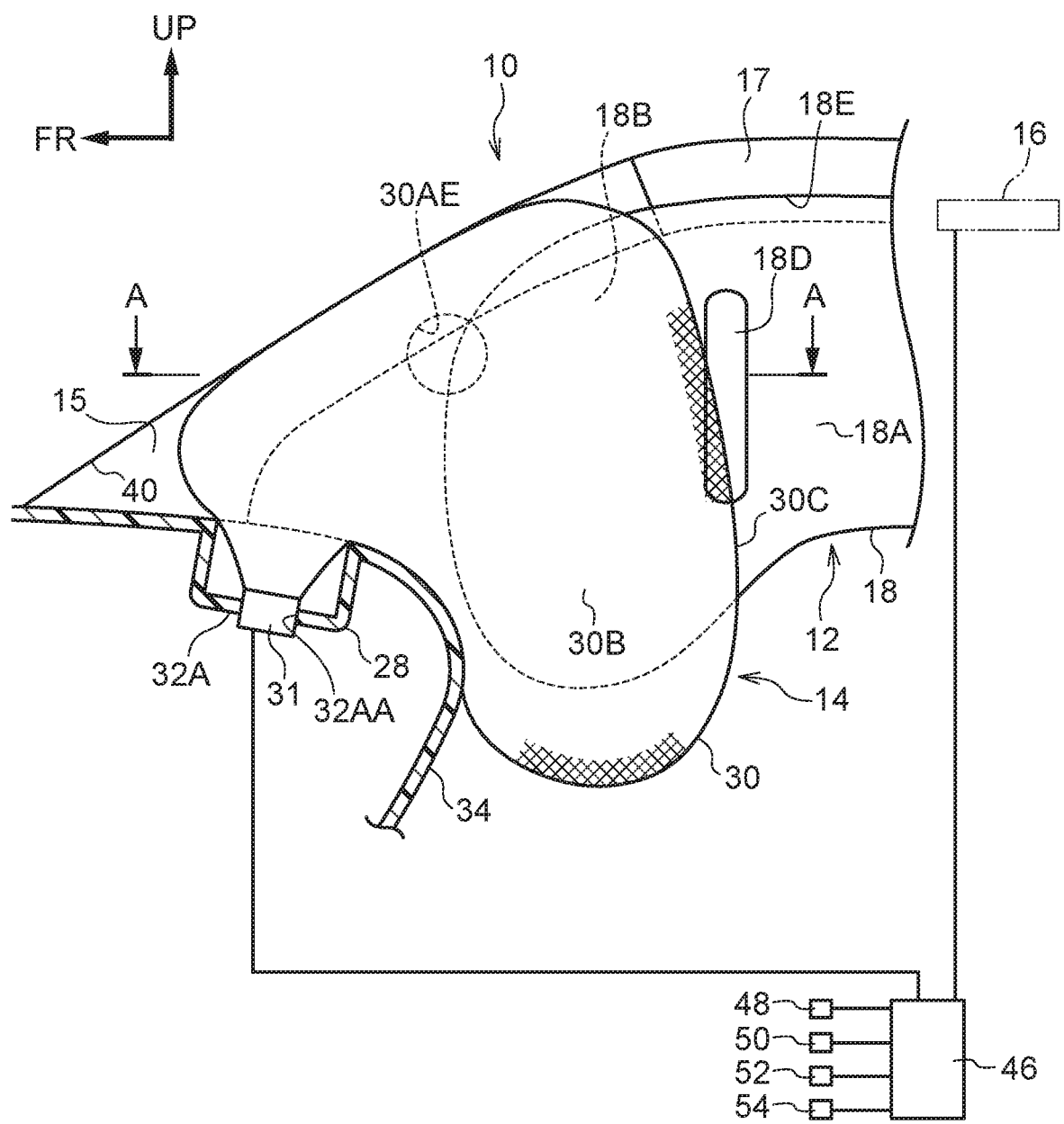
FIG. 1 is a side view illustrating an inflated and deployed state of a vehicle airbag device according to a first exemplary embodiment.
Figure 2:
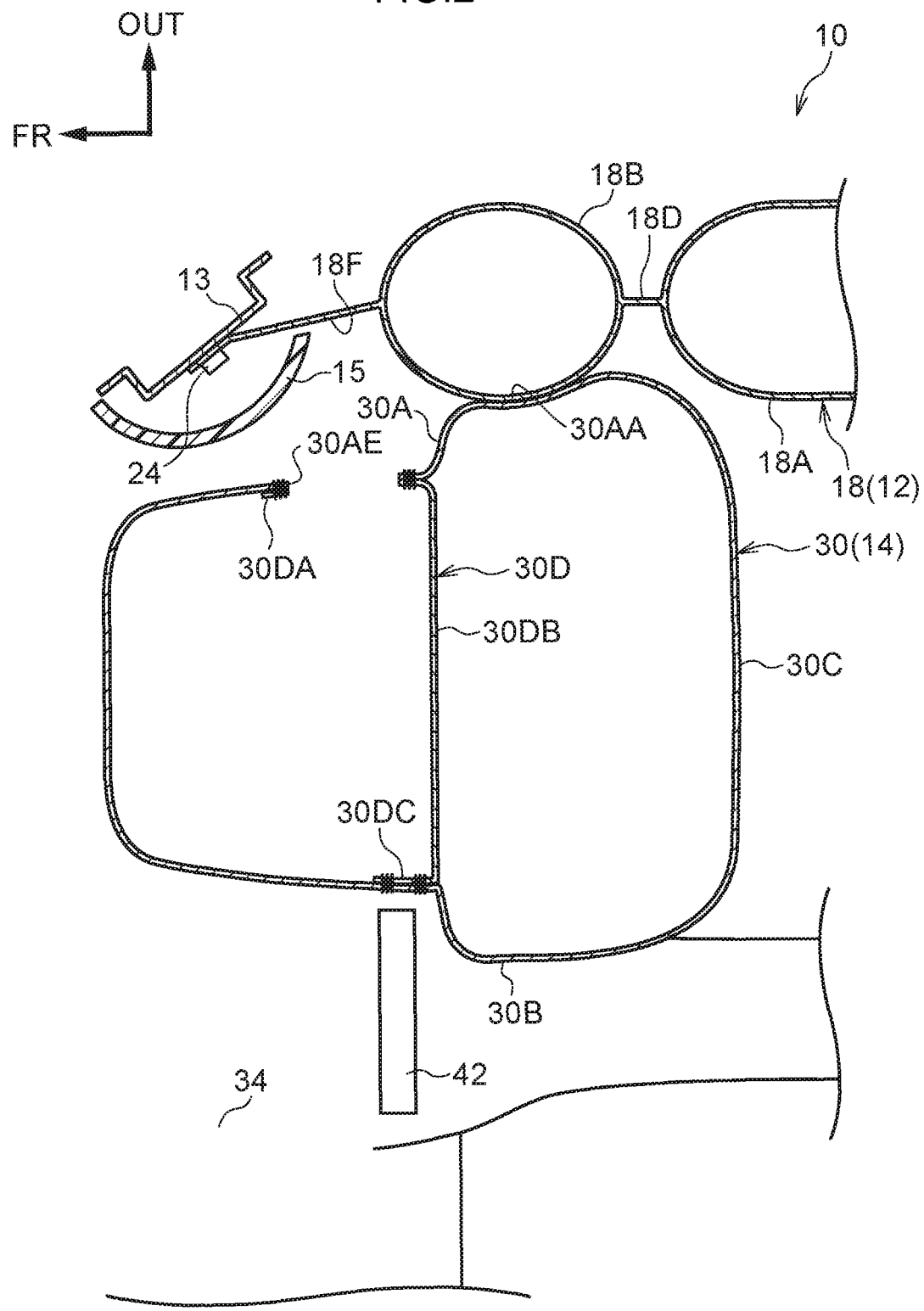
FIG. 2 is an enlarged cross-section illustrating a state sectioned along line A-A in FIG. 1.
Figure 3:
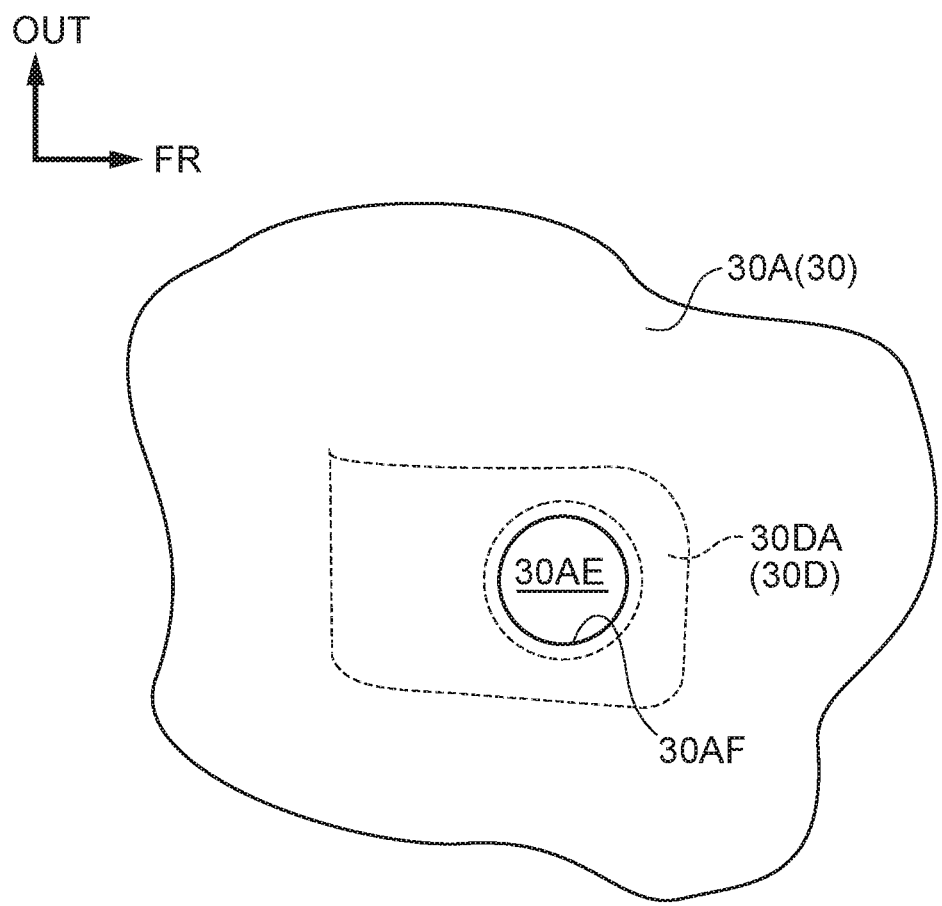
FIG. 3 is a schematic diagram illustrating the vicinity of a vent hole in a vehicle airbag device according to the first exemplary embodiment.

Explanation follows regarding a first exemplary embodiment of a vehicle airbag device according to the present disclosure, with reference to FIG. 1 to FIG. 3. Note that in the drawings, the arrow FR indicates a vehicle front side, the arrow UP indicates a vehicle upper side, and the arrow OUT indicates a vehicle width direction outer side as appropriate.

Overall Configuration

FIG. 1 is a side view illustrating an actuated state of a vehicle airbag device 10 according to the present exemplary embodiment, as viewed from inside a vehicle cabin. As illustrated in FIG. 1, the vehicle airbag device 10 includes a curtain airbag module 12 and a front passenger seat airbag module 14.

Curtain Airbag Module

The curtain airbag module 12 is configured including a substantially circular column shaped inflator 16 that generates gas in a vehicle collision, and a curtain airbag 18 that is connected to the inflator 16 and inflates and deploys on being supplied with gas generated by the inflator 16.

Prior to installation to the vehicle, the curtain airbag module 12 is assembled into a long, thin elongated member in which the curtain airbag 18 is folded up. In this state, the curtain airbag module 12 is stowed in a space between a roof side rail 17 and a vehicle width direction outer side end portion of a ceiling (not illustrated in the drawings), a space between a front pillar 13 and a front pillar garnish 15 (see FIG. 2) installed at the vehicle cabin inner side of the front pillar 13, and a space between a rear pillar and a rear pillar garnish (neither of which are illustrated in the drawings) installed at the vehicle cabin inner side of the rear pillar.

The inflator 16 is formed in a long thin circular column shape, and is, for example, disposed with its axial direction along the vehicle front-rear direction at the vehicle upper side of a center pillar. An outer peripheral portion of a leading end of the inflator 16 is formed with plural gas ejection holes. The inside of the inflator 16 is filled with a gas generating agent and the like, and on actuation of the inflator 16, the gas generating agent combusts to generate a large quantity of gas, which is ejected through the gas ejection holes. The inflator 16 configured as described above is fixed to the roof side rail 17 through a bracket, not illustrated in the drawings.

Curtain Airbag

The curtain airbag 18 is configured as a substantially rectangular bag shaped cloth member that is large enough when inflated and deployed to be able to substantially cover both a side window of a side door at a front seat (the front passenger seat in this example) and a side window of a side door at a rear seat (none of which are illustrated in the drawings) in side view of the vehicle. More specifically, the curtain airbag 18 includes a gas entry portion, not illustrated in the drawings, into which the leading end side of the inflator 16 is inserted, a gas supply path, not illustrated in the drawings, extending in a straight line along the vehicle front-rear direction so as to run along an upper edge of the curtain airbag 18, a front main chamber 18A (see FIG. 2) that inflates and deploys at the vehicle width direction outer side of a head, corresponding to a head protection area for an occupant seated in the front seat, a rear main chamber, not illustrated in the drawings, that inflates and deploys at the vehicle width direction outer side of a head, corresponding to a head protection area for an occupant seated in the rear seat, a front delay chamber 18B (see FIG. 2) provided adjacent to and at the vehicle front-rear direction front side of the front main chamber 18A, and a rear delay chamber, not illustrated in the drawings, provided adjacent to and at the vehicle front-rear direction front side of the rear main chamber. As viewed from the side of the vehicle, a lower end portion of the front main chamber 18A extends toward the vehicle lower side so as to overlap a door trim of the front door when inflated and deployed.

Other portions of the curtain airbag 18 configure non-inflating portions into which gas does not flow. Namely, a first non-inflating portion, not illustrated in the drawings, is set at an outer peripheral portion of the curtain airbag 18, and a second non-inflating portion 18D is set extending along the vehicle vertical direction between the front main chamber 18A and the front delay chamber 18B. Various other non-inflating portions are set in the curtain airbag 18 so as to reduce the output of the inflator 16 by limiting the gas supply rate. Note that the configuration of the inflating portions, non-inflating portions, and so on of the curtain airbag 18 employ known configurations such as that in JP-A No. 2016-055824, and so detailed explanation thereof is omitted.

Further details follow regarding the respective portions of the curtain airbag 18 that are supplied with gas. The gas entry portion is formed at a vehicle front-rear direction substantially intermediate portion of an upper edge 18E of the curtain airbag 18. The inflator 16 is connected to the gas entry portion such that the gas generated by the inflator 16 is supplied into the curtain airbag 18 through the gas entry portion. The gas entry portion is in communication with a vehicle front-rear direction intermediate portion of the gas supply path.

The front main chamber 18A inflates and deploys over a range spanning from the vicinity of a vehicle front-rear direction intermediate portion of the front seat side window, and overlapping the center pillar. As illustrated in FIG. 2, the front delay chamber 18B is disposed at the vehicle front-rear direction front side of the front main chamber 18A, with the second non-inflating portion 18D present between the front delay chamber 18B and the front main chamber 18A. The front delay chamber 18B is formed so as to inflate in a circular column shape with its length direction along the vehicle vertical direction. Due to the above configuration, during inflation and deployment the curtain airbag 18 deploys toward the vehicle lower side from a vehicle width direction outer side end portion of the ceiling, and inflates in the vehicle width direction.

The upper edge 18E of the curtain airbag 18 (see FIG. 1) is integrally formed with plural tabs, not illustrated in the drawings, at appropriate spacings. The plural tabs extend from the upper edge 18E of the curtain airbag 18 toward the vehicle upper side. Each tab is fixed (anchored) to the front pillar 13 or the roof side rail 17 using fasteners, not illustrated in the drawings. Moreover, as illustrated in FIG. 2, one end portion of a strap shaped tension belt 18F is attached to a front end portion of the curtain airbag 18. The other end portion of the tension belt 18F is fixed to the front pillar 13 by a fixing bolt 24.

The curtain airbag 18 and the inflator 16 described above are provided on both width direction sides of the vehicle. Namely, a pair of curtain airbag modules 12 is configured including a pair of left and right curtain airbags 18 and a pair of left and right inflators 16. Note that the curtain airbag 18 and the inflator 16 on the vehicle left side are omitted from illustration.

Front Passenger Seat Airbag

As illustrated in FIG. 1, the front passenger seat airbag module 14 is configured including a substantially rectangular box shaped module case 28 opening toward the upper side, a front passenger seat airbag 30 (illustrated in an inflated and deployed state in FIG. 1) that is normally stowed in a folded state in the module case 28, and an inflator 31 that ejects gas in order to supply gas to the front passenger seat airbag 30. The front passenger seat airbag module 14 is disposed within (inside) an instrument panel 34 at the front side of the non-illustrated front passenger seat. The front passenger seat airbag module 14 is, for example, supported by instrument panel reinforcement (not illustrated in the drawings) extending along the vehicle width direction within the instrument panel 34. The instrument panel 34 is formed with an airbag door, not illustrated in the drawings, at a location covering the module case 28.

The front passenger seat airbag 30 is, for example, configured as a substantially box shaped bag by stitching together outer peripheral portions of plural base cloths. As illustrated in FIG. 2, in the present exemplary embodiment the front passenger seat airbag 30 includes a first side-wall 30A configuring a vehicle width direction outer side of the front passenger seat airbag 30, and a second side-wall 30B configuring a vehicle width direction inner side of the front passenger seat airbag 30 and opposing the first side-wall 30A. The front passenger seat airbag 30 inflates and deploys from the instrument panel 34 toward the vehicle rear side on being supplied with gas from the inflator 31, and is thus disposed at the front side of a non-illustrated occupant in the front passenger seat. A width direction central portion of a restraining face 30C configuring a vehicle rear side of the front passenger seat airbag 30 is positioned at the front side of the head of the occupant in the front passenger seat, and both width direction end portions of the restraining face 30C of the front passenger seat airbag 30 are positioned at the front sides of the respective shoulders of the occupant in the front passenger seat. The head and upper body of the occupant in the front passenger seat are thus restrained by the front passenger seat airbag 30 when they move toward the front side.

As illustrated in FIG. 1, a front end portion of the front passenger seat airbag 30 is configured so as to abut the instrument panel 34 and a windshield 40, and the front passenger seat airbag 30 is disposed overlapping (superimposed on) a display 42, serving as an vehicle-interior projecting object, in side view (see FIG. 2). A rear lower end portion of the front passenger seat airbag 30 bulges toward the lower side at the rear side of the instrument panel 34. The front passenger seat airbag 30 is thus supported from the front side by the instrument panel 34 and the windshield 40. Note that as illustrated in FIG. 2, the display 42 is, for example, a device that displays a map from a non-illustrated car navigation device, or displays vehicle information for the occupant, and projects substantially toward the vehicle upper side from a vehicle width direction central portion of the instrument panel 34.

When inflated and deployed, the first side-wall 30A (see FIG. 2) of the front passenger seat airbag 30 is positioned overlapping (superimposed on) the front pillar garnish 15 and the front delay chamber 18B of the curtain airbag 18 in side view. As illustrated in FIG. 2, the front delay chamber 18B is abutted by an abutting portion 30AA provided at the vehicle rear side of the first side-wall 30A.

Tether

A tether 30D is provided inside the front passenger seat airbag 30. The tether 30D is, for example, configured from the same base cloth as the front passenger seat airbag 30, and is formed in a substantially belt shape with a length direction along the vehicle width direction. One end portion 30DA serving as a length direction end portion of the tether 30D is stitched to a vehicle front-rear direction substantially central portion of the first side-wall 30A. More specifically, the one end portion 30DA of the tether 30D is bent with respect to a tether base end portion 30DB with a thickness direction in the vehicle front-rear direction, such that the one end portion 30DA is superimposed on the first side-wall 30A from the inner side, and extends toward the vehicle front side as far as a position enabling the entirety of an outer edge portion 30AF (see FIG. 3) of a vent hole 30AE, described later, formed in the first side-wall 30A, to be surrounded.

Another length direction end portion 30DC of the tether 30D is stitched at the vehicle right side of a location corresponding to the display 42 at a vehicle front-rear direction substantially central portion of the second side-wall 30B of the front passenger seat airbag 30. More specifically, the other end portion 30DC of the tether 30D is bent toward the vehicle front side with respect to the tether base end portion 30DB so as to be superimposed on the second side-wall 30B from the inner side.

A vehicle width direction dimension of the tether 30D is set shorter than a vehicle width direction dimension of the restraining face 30C. Accordingly, when the front passenger seat airbag 30 is inflated and deployed, the tether 30D pulls the first side-wall 30A toward the vehicle width direction inner side, and pulls the second side-wall 30B toward the vehicle width direction outer side. Namely, the first side-wall 30A and the second side-wall 30B are pulled toward the vehicle width direction center of the front passenger seat airbag 30 by the tether 30D. Specifically, in plan view, a portion of the first side-wall 30A from a vehicle front-rear direction substantially central portion toward the vehicle front side is spaced apart from the front pillar garnish 15, and a portion of the second side-wall 30B from a vehicle front-rear direction substantially central portion toward the vehicle front side is positioned at the vehicle width direction outer side of the display 42. In other words, in plan view, the front passenger seat airbag 30 has a stepped shape with a smaller vehicle width direction dimension at the vehicle front side than the vehicle width direction dimension at the vehicle rear side.

Although not illustrated in the drawings, in the present exemplary embodiment plural tethers 30D configured as described above are provided at spacings in the vehicle vertical direction. Non-illustrated tethers that control inflation and deployment of the front passenger seat airbag 30 in the vehicle front-rear direction are disposed in the spacings between each of the tethers 30D.

Vent Hole

The vent hole 30AE that allows gas to escape from inside the front passenger seat airbag 30 is formed in the first side-wall 30A of the front passenger seat airbag 30 at a location on the front pillar garnish 15 side, namely a location substantially opposing the front pillar garnish 15. The vent hole 30AE is positioned further to the vehicle front side than the tethers 30D (tether base end portions 30DB) at the vehicle front side of the first side-wall 30A, and places the interior of the front passenger seat airbag 30 and the exterior of the front passenger seat airbag 30 in communication with each other.

As illustrated in FIG. 3, in side view, the vent hole 30AE is configured with a circular shape, and the one end portion 30DA of the corresponding tether 30D is stitched so as to be superimposed on the outer edge portion 30AF of the vent hole 30AE. A through hole with substantially the same diameter as the vent hole 30AE is formed in the one end portion 30DA of the tether 30D at a position corresponding to the vent hole 30AE. Accordingly, the vent hole 30AE is reinforced, but the vent hole 30AE is not blocked off, by the tether 30D.

Note that the front passenger seat airbag 30 is normally folded up along the front-rear direction. This is achieved by laying the front passenger seat airbag 30 out flat and then folding up the front passenger seat airbag 30 using concertina folding, roll-up folding, or a combination of concertina folding and roll-up folding. The folded-up front passenger seat airbag 30 is housed inside the module case 28.

Inflator

As illustrated in FIG. 1, the inflator 31 is installed inside a front end portion of the front passenger seat airbag 30. The inflator 31 is made from metal, is formed in a hollow, substantially circular column shape, and is disposed with its axial direction substantially in the vertical direction. An attachment flange, not illustrated in the drawings, is provided at a vertical direction intermediate portion of an outer peripheral portion of the inflator 31. The inflator 31 is inserted into an attachment hole 32AA formed in a bottom wall 32A of the module case 28, and the attachment flange is fixed to the bottom wall 32A using a fastening member (not illustrated in the drawings) such as a bolt. An upper portion of the inflator 31 thus projects toward the upper side with respect to the bottom wall 32A of the module case 28, and a lower portion of the inflator 31 projects toward the lower side with respect to the module case 28.

Actuation of the vehicle airbag device 10 described above is controlled by a controller 46. As an example, a front airbag sensor 48, a small overlap collision detection sensor 50, a side collision detection sensor 52, and a rollover detection sensor 54 are connected to an input side of the controller 46. The front airbag sensor 48 is installed in a front side member or the like, and primarily detects offset collisions, including full overlap collisions and oblique collisions. The small overlap collision detection sensor 50 is, for example, installed to front bumper reinforcement at a portion further to the vehicle width direction outer side than a location where the front bumper reinforcement is connected to a front side member (a curving corner portion or the like). The side collision detection sensor 52 is installed to the center pillar or the like, and primarily detects side collisions. The rollover detection sensor 54 is installed in the vicinity of a central portion of a vehicle body floor, and detects vehicle rollover. The inflator 16 of the curtain airbag module 12, the inflator 31 of the front passenger seat airbag module 14, and the like are connected to an output side of the controller 46.

To clarify, an oblique collision (MDB oblique collision, collision at an angle) refers, for example, to a collision from the oblique front as defined by the NHTSA (as an example, a collision with a relative angle of 15° with respect to the collision counterpart, and a vehicle width direction overlap amount of around 35%). As an example, the present exemplary embodiment envisages an oblique collision at a relative speed of 90 km/hr. A small overlap collision refers to, for example, a frontal vehicle collision when the vehicle width direction overlap amount with the collision counterpart is 25% or less, as defined by the IIHS. For example, a collision at the vehicle width direction outer side of a front side member configuring vehicle body framework would be classed as a small overlap collision. As an example, the present exemplary embodiment envisages a small overlap collision at a relative speed of 64 km/hr. The IIHS is the abbreviated name of the Insurance Institute for Highway Safety, and the NHTSA is the abbreviated name of the National Highway Traffic Safety Administration in America.

Operation of First Exemplary Embodiment

Explanation Follows Regarding Operation of the First Exemplary Embodiment

As illustrated in FIG. 1, the vehicle airbag device 10 of the first exemplary embodiment includes the curtain airbag 18 and the front passenger seat airbag 30. The curtain airbag 18 actuates in a vehicle collision such that gas generated by the inflator 16 is supplied into the curtain airbag 18, and the curtain airbag 18 inflates and deploys from the vehicle width direction outer side end portion of the ceiling toward the vehicle lower side. Gas from the inflator 31 is supplied into the front passenger seat airbag 30, such that the front passenger seat airbag 30 inflates and deploys in front of the front passenger seat. The front passenger seat airbag 30 includes the first side-wall 30A configuring a vehicle width direction outer side location of the front passenger seat airbag 30, and the first side-wall 30A includes the abutting portion 30AA that abuts the curtain airbag 18 when inflated and deployed. Moreover, when inflated and deployed the first side-wall 30A is spaced apart from the front pillar garnish 15, and the vent hole 30AE is provided on the front pillar garnish 15 side of the first side-wall 30A. Accordingly, even though the front passenger seat airbag 30 and the curtain airbag 18 are set with large vehicle width direction dimensions when inflated and deployed in order to improve restraint performance in an oblique collision or the like, and the amount of interference and range of interference between the front passenger seat airbag 30 and the curtain airbag 18 are large, gas is not impeded from escaping through the vent hole 30AE by the front pillar garnish 15 or the curtain airbag 18 when inflated and deployed. This thereby enables stable functioning of the vent hole 30AE in the front passenger seat airbag 30 to be achieved.

Moreover, as illustrated in FIG. 2, the tethers 30D are attached at the vehicle rear side of the vent hole 30AE in the first side-wall 30A of the front passenger seat airbag 30. The tethers 30D are configured to pull the first side-wall 30A toward the vehicle width direction inner side when the front passenger seat airbag 30 is inflated and deployed. The first side-wall 30A is therefore reliably kept spaced apart from the front pillar garnish 15 by the tethers 30D, and since the vent hole 30AE is disposed close to the tethers 30D, gas can more reliably escape through the vent hole 30AE. This thereby enables even more stable functioning of the vent hole 30AE in the front passenger seat airbag 30 to be achieved.

The front passenger seat airbag 30 also includes the second side-wall 30B opposing the first side-wall 30A. The second side-wall 30B is positioned at the vehicle width direction outer side of the display 42 that is provided to the instrument panel 34 so as to project into the vehicle cabin interior. The tethers 30D are attached to the second side-wall 30B at the vehicle rear side of a location corresponding to the display 42. The tethers 30D pull the second side-wall 30B toward the vehicle width direction outer side when the front passenger seat airbag 30 is inflated and deployed. Interference between the front passenger seat airbag 30 and the display 42 in a vehicle collision, which would impede inflation and deployment, can accordingly be suppressed. This thereby enables deployment performance of the front passenger seat airbag 30 to be improved such that interference between the front passenger seat airbag 30 and the display 42 does not occur.

Moreover, the tethers 30D are provided at the vehicle front side of the abutting portion 30AA of the first side-wall 30A of the front passenger seat airbag 30. The interference amount between the front passenger seat airbag 30 and the curtain airbag 18 is therefore not reduced. Namely, restraint performance of the head of the occupant moving obliquely forward to between the front passenger seat airbag 30 and the curtain airbag 18 in an oblique collision or the like can be maintained. Since a gap can be provided between the vent hole 30AE and the front pillar garnish 15 in this state, gas is able to escape smoothly through the vent hole 30AE, while restraint performance of the occupant moving to between the front passenger seat airbag 30 and the curtain airbag 18 in an oblique collision or the like is maintained. This thereby enables stable functioning of the vent hole 30AE in the front passenger seat airbag 30 to be achieved while improving occupant restraint performance in an oblique collision.

The one end portion 30DA of the corresponding tether 30D is superimposed on the first side-wall 30A in the thickness direction so as to surround the outer edge portion 30AF of the vent hole 30AE, thereby enabling the vent hole 30AE to be reinforced. Namely, since the tether 30D doubles as a reinforcing patch for the vent hole 30AE, there is no need for a separate reinforcing patch for the vent hole 30AE. This thereby enables both a reduction in costs and stable functioning of the vent hole 30AE in the front passenger seat airbag 30 to be achieved.

Second Exemplary Embodiment

Figure 4:
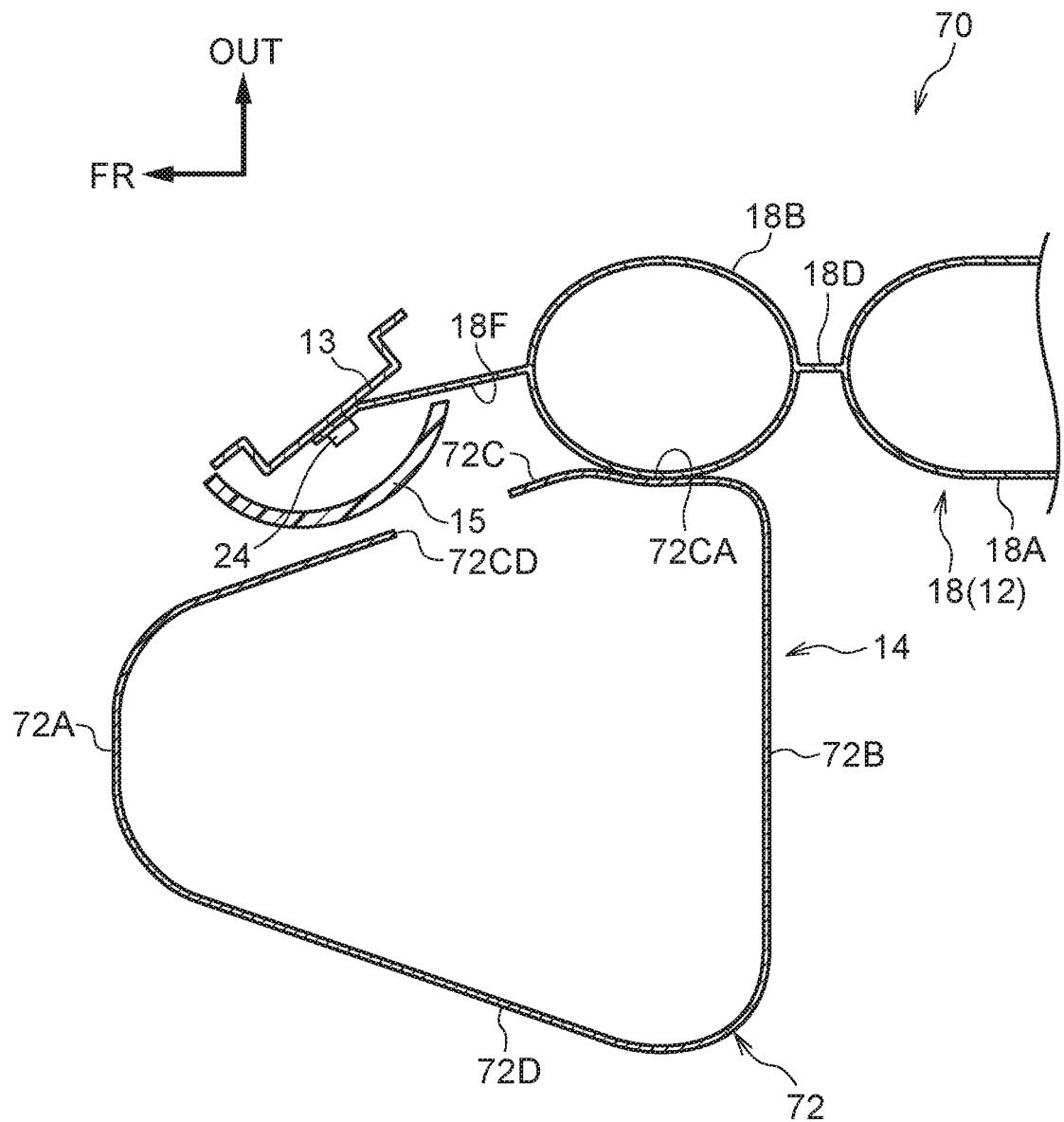
FIG. 4 is an enlarged cross-section corresponding to FIG. 2, illustrating an inflated and deployed state of a vehicle airbag device according to a second exemplary embodiment.

Next, explanation follows regarding a vehicle airbag device 70 according to a second exemplary embodiment of the present disclosure, with reference to FIG. 4. Note that configuration portions that are the same as those in the first exemplary embodiment described above are allocated the same reference numerals, and explanation thereof is omitted.

The vehicle airbag device 70 according to the second exemplary embodiment has similar basic configuration to the first exemplary embodiment, but is distinct therefrom in the respect that a vehicle width direction dimension of a vehicle front side end portion 72A of a front passenger seat airbag 72 is set smaller than a vehicle width direction dimension of a vehicle rear side end portion 72B of the front passenger seat airbag 72.

Namely, as illustrated in FIG. 4, the front passenger seat airbag 72 of the front passenger seat airbag module 14 is, for example, configured as a substantially box shaped bag by stitching together outer peripheral portions of plural base cloths. In the present exemplary embodiment, the front passenger seat airbag 72 includes a first side-wall 72C configuring a vehicle width direction outer side of the front passenger seat airbag 72, and a second side-wall 72D opposing the first side-wall 72C and configuring a vehicle width direction inner side of the front passenger seat airbag 72. When the front passenger seat airbag 72 is inflated and deployed, the first side-wall 72C is positioned overlapping (superimposed on) the front pillar garnish 15 and the front delay chamber 18B of the curtain airbag 18 in side view. The front delay chamber 18B is abutted by an abutting portion 72CA provided at the vehicle rear side of the first side-wall 72C.

The vehicle width direction dimension of the vehicle front side end portion 72A of the front passenger seat airbag 72 is set smaller than the vehicle width direction dimension of the vehicle rear side end portion 72B. Accordingly, when inflated and deployed, in plan view, the front passenger seat airbag 72 is configured in a substantially trapezoidal shape with a vehicle width direction dimension increasing on progression toward the vehicle rear side. In plan view, the first side-wall 72C is thereby inclined toward the vehicle width direction outer side on progression toward the vehicle rear side. Moreover, in plan view, the second side-wall 72D is inclined toward the vehicle width direction inner side on progression toward the vehicle rear side. Note that the vehicle width direction dimension of the vehicle front side end portion 72A is set to a dimension such that the first side-wall 72C is kept spaced apart from the front pillar garnish 15.

A vent hole 72CD that allows gas to escape from inside the front passenger seat airbag 72 is formed in the first side-wall 72C of the front passenger seat airbag 72 at a location opposing the front pillar garnish 15. The vent hole 72CD is positioned further toward the vehicle front side than the abutting portion 72CA on the vehicle front side of the first side-wall 72C, and places the interior of the front passenger seat airbag 72 and the exterior of the front passenger seat airbag 72 in communication with each other.

Operation of Second Exemplary Embodiment

Explanation Follows Regarding Operation of the Second Exemplary Embodiment

The configuration described above is similar to the configuration of the vehicle airbag device 10 of the first exemplary embodiment, with the exception of the point that the vehicle width direction dimension of the vehicle front side end portion 72A of the front passenger seat airbag 72 is set smaller than the vehicle width direction dimension of the vehicle rear side end portion 72B. Accordingly, similar advantageous effects to those of the first exemplary embodiment can be obtained. In the front passenger seat airbag 72, the vehicle width direction dimension of the vehicle front side end portion 72A is set smaller than the vehicle width direction dimension of the vehicle rear side end portion 72B so as not to abut the front pillar garnish 15. Accordingly, a gap can be provided between the first side-wall 72C and the front pillar garnish 15 using the shape of the front passenger seat airbag 72 itself. This thereby enables gas to escape more reliably through the vent hole 72CD using a simple configuration. This thereby enables both a reduction in costs and stable functioning of the vent hole 72CD in the front passenger seat airbag 72 to be achieved.

In the second exemplary embodiment described above, the first side-wall 72C is kept spaced apart from the front pillar garnish 15 using the external shape of the front passenger seat airbag 72 alone. However, there is no limitation thereto, and tethers 30D may be provided inside the front passenger seat airbag 72.

In the first exemplary embodiment described above, the vent hole 30AE is disposed at the vehicle front side of the tethers 30D. However, there is no limitation thereto, and the vent hole 30AE may be disposed at another position, such as toward the vehicle rear side.

Although plural of the tethers 30D are provided inside the front passenger seat airbag 30 in the vehicle vertical direction, there is no limitation thereto, and configuration may be made with a single tether 30D.

Although the tethers 30D pull the second side-wall 30B toward the vehicle width direction outer side, there is no limitation thereto, and configuration may be made such that the other end portions 30DC of the tethers 30D are attached to a location other than the second side-wall 30B and do not pull the second side-wall 30B toward the vehicle width direction outer side.

Although explanation has been given regarding exemplary embodiments of the present disclosure, the present disclosure is not limited to the above, and obviously various other modifications may be implemented within a range not departing from the spirit of the present disclosure.

What is claimed is:

1. A vehicle airbag device comprising:
   a curtain airbag that is inflated and deployed from a vehicle width direction outer side end portion of a ceiling toward a vehicle lower side by gas being supplied into the curtain airbag from an inflator actuated in a vehicle collision to generate the gas; and
   a front passenger seat airbag that is inflated and deployed in front of a front passenger seat by gas being supplied into the front passenger seat airbag from an inflator actuated in a vehicle collision to generate the gas, and that includes a first side-wall and a vent hole, wherein:
   the first side-wall configures a vehicle width direction outer side location of the front passenger seat airbag, including an abutting portion that abuts the curtain airbag when inflated and deployed, and being spaced apart from a front pillar garnish,
   the vent hole is provided in the first side-wall on a front pillar garnish side,
   the vent hole is positioned further to a vehicle front side than the abutting portion, is spaced from the abutting portion, and is positioned at a location opposing the front pillar garnish, and
   a tether that pulls the first side-wall toward a vehicle width direction inner side when the front passenger seat airbag is inflated and deployed is attached at a vehicle rear side of the vent hole in the first side-wall of the front passenger seat airbag.

2. The vehicle airbag device of claim 1, wherein:
   the front passenger seat airbag includes a second side-wall opposing the first side-wall and positioned at a vehicle width direction outer side of a vehicle-interior projecting object provided at an instrument panel so as to project into a vehicle cabin; and the tether is attached to the second side-wall at the vehicle rear side of a location corresponding to the vehicle-interior projecting object so as to pull the second side-wall toward the vehicle width direction outer side when the front passenger seat airbag is inflated and deployed.

3. The vehicle airbag device of claim 1, wherein the tether is provided at a vehicle front side of the abutting portion of the front passenger seat airbag.

4. The vehicle airbag device of claim 1, wherein an end portion of the tether is attached superimposed on the first side-wall in a thickness direction so as to surround an outer edge portion of the vent hole.

5. The vehicle airbag device of claim 4, wherein a through hole with substantially a same diameter as the vent hole is formed in the end portion of the tether at a position corresponding to the vent hole.

6. The vehicle airbag device of claim 1, wherein a vehicle width direction dimension of a vehicle front side end portion of the front passenger seat airbag is smaller than a vehicle width direction dimension of a vehicle rear side end portion of the front passenger seat airbag such that the front passenger seat airbag does not abut the front pillar garnish.

7. The vehicle airbag device of claim 1, wherein in a plan view, the front passenger seat airbag has a stepped shape with a smaller vehicle width direction dimension at the vehicle front side than the vehicle width direction dimension at the vehicle rear side.

8. The vehicle airbag device of claim 1, wherein when inflated and deployed, in a plan view, the front passenger seat airbag is configured in a substantially trapezoidal shape with a vehicle width direction dimension increasing on progression toward the vehicle rear side.

9. A vehicle airbag device comprising:
a curtain airbag that is inflated and deployed from a vehicle width direction outer side end portion of a ceiling toward a vehicle lower side by gas being supplied into the curtain airbag from an inflator actuated in a vehicle collision to generate the gas; and
a front passenger seat airbag that is inflated and deployed in front of a front passenger seat by gas being supplied into the front passenger seat airbag from an inflator actuated in a vehicle collision to generate the gas, and that includes a first side-wall and a vent hole, wherein:
the first side-wall configures a vehicle width direction outer side location of the front passenger seat airbag, including an abutting portion that abuts the curtain airbag when inflated and deployed, and being spaced apart from a front pillar garnish,
the vent hole is provided in the first side-wall on a front pillar garnish side,
a tether that pulls the first side-wall toward a vehicle width direction inner side when the front passenger seat airbag is inflated and deployed is attached at a vehicle rear side of the vent hole in the first side-wall of the front passenger seat airbag,
the front passenger seat airbag includes a second side-wall opposing the first side-wall and positioned at a vehicle width direction outer side of a vehicle-interior projecting object provided at an instrument panel so as to project into a vehicle cabin; and
the tether is attached to the second side-wall at a vehicle rear side of a location corresponding to the vehicle-interior projecting object so as to pull the second side-wall toward the vehicle width direction outer side when the front passenger seat airbag is inflated and deployed.

10. The vehicle airbag device of claim 9, wherein the tether is provided at a vehicle front side of the abutting portion of the front passenger seat airbag.

11. The vehicle airbag device of claim 9, wherein an end portion of the tether is attached superimposed on the first side-wall in a thickness direction so as to surround an outer edge portion of the vent hole.

12. The vehicle airbag device of claim 9, wherein a vehicle width direction dimension of a vehicle front side end portion of the front passenger seat airbag is smaller than a vehicle width direction dimension of a vehicle rear side end portion of the front passenger seat airbag such that the front passenger seat airbag does not abut the front pillar garnish.

* * * * *